Figure 1:
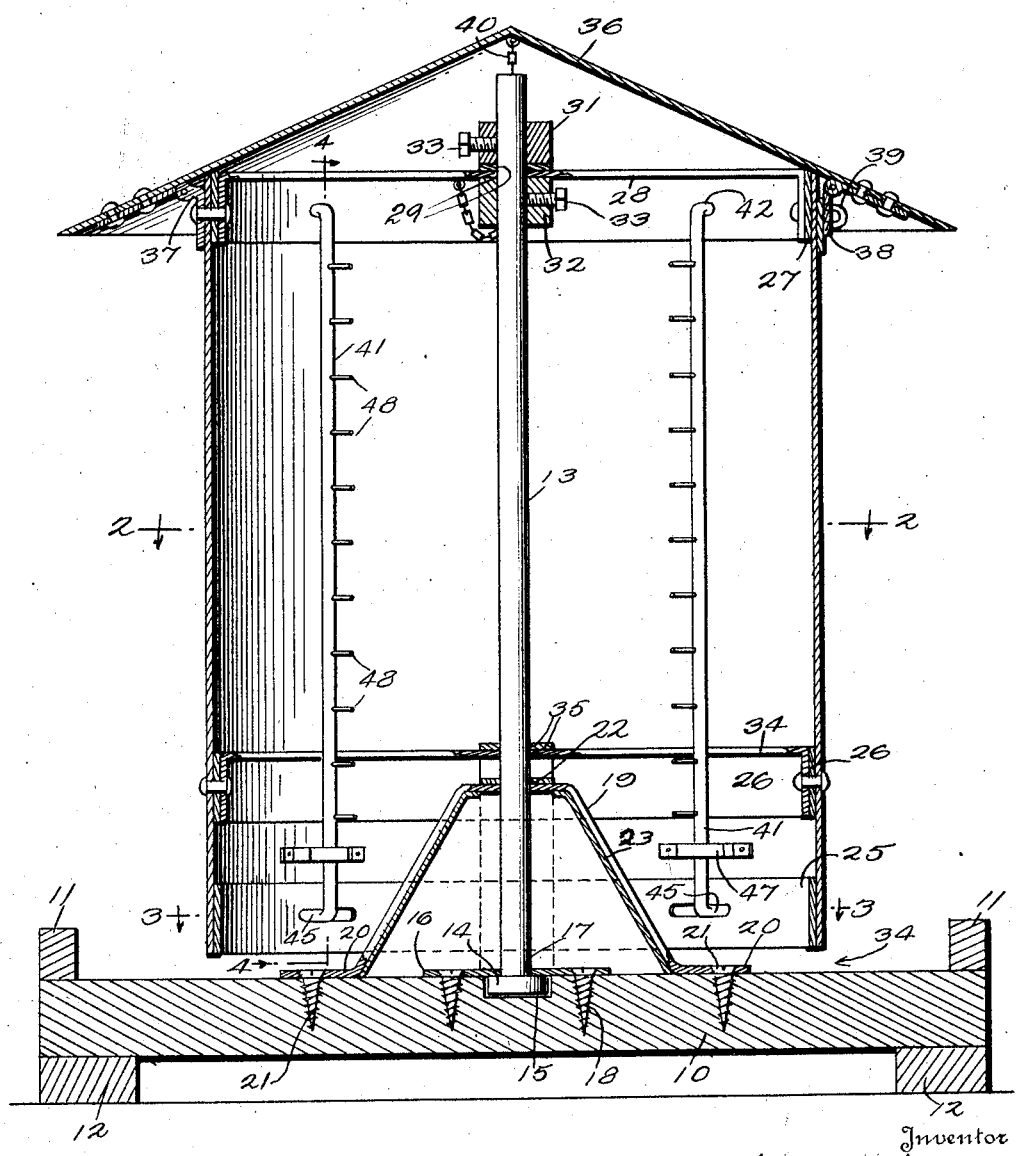

F. FOUTS.
HOG FEEDER.
APPLICATION FILED MAR. 22, 1920.

1,392,004.

Patented Sept. 27, 1921.
3 SHEETS—SHEET 1.

Inventor
Frank Fouts,
By Deane and Custer
his Attorneys

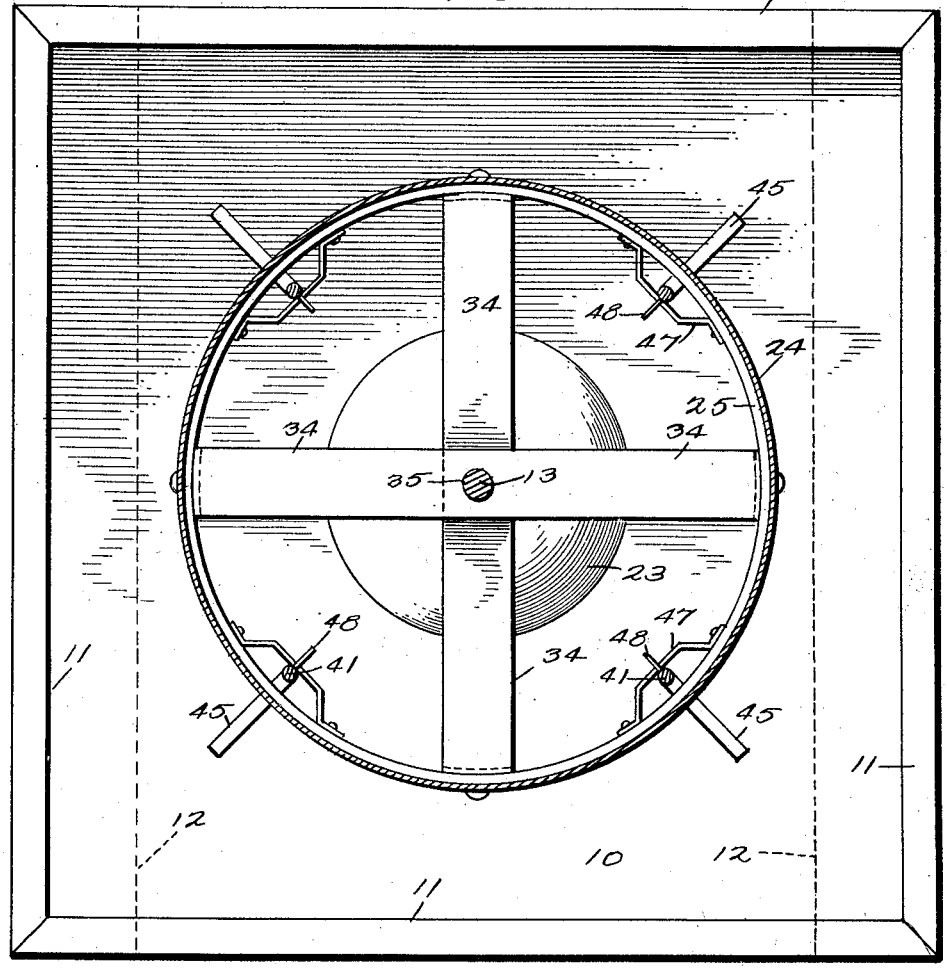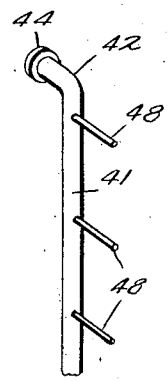

F. FOUTS.
HOG FEEDER.
APPLICATION FILED MAR. 22, 1920.
1,392,004.
Patented Sept. 27, 1921.
3 SHEETS—SHEET 3.
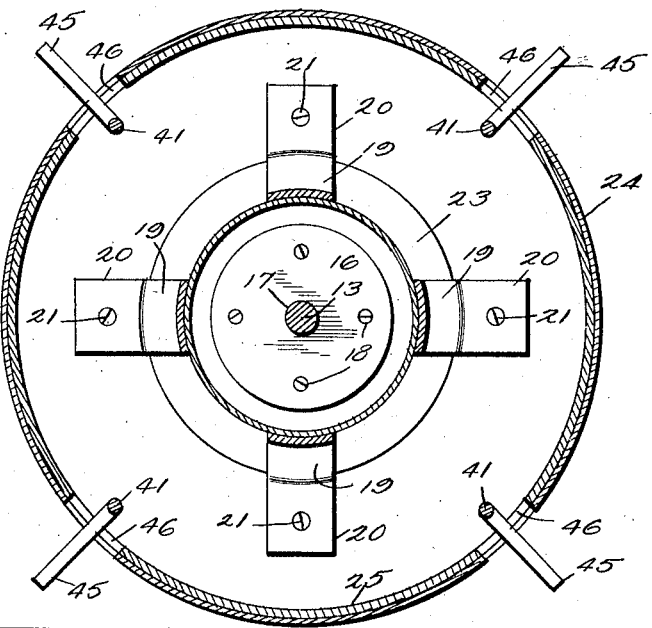
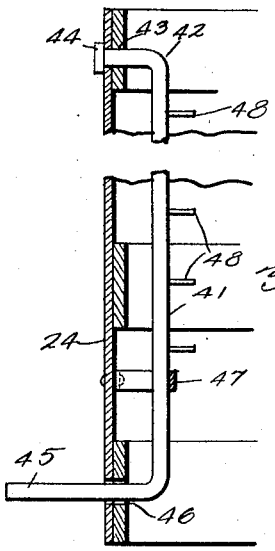
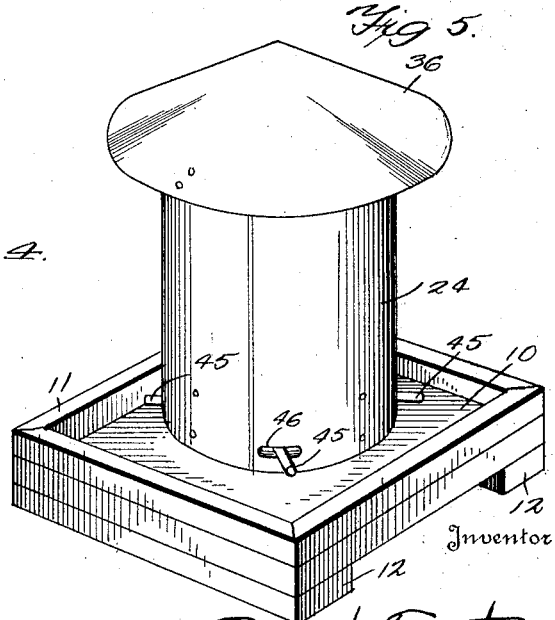
Inventor
Frank Fouts
By Deane and Custer
his Attorney

UNITED STATES PATENT OFFICE.

FRANK FOUTS, OF GALVESTON, INDIANA.

HOG-FEEDER.

1,392,004.  Specification of Letters Patent.  Patented Sept. 27, 1921.

Application filed March 22, 1920. Serial No. 367,679.

*To all whom it may concern:*

Be it known that I, FRANK FOUTS, a citizen of the United States, residing at Galveston, in the county of Cass and State of Indiana, have invented certain new and useful Improvements in Hog-Feeders, of which the following is a specification, reference being had therein to the accompanying drawing.

My invention relates to hog feeders.

An important object of the invention is to provide a hog feeding device, having means adapted to be actuated by the hog to turn the body portion or container, for effecting the discharge of the feed, or to be moved with relation to the container, for effecting the discharge of the feed.

A further object of the invention is to provide means for vertically adjusting the body portion or container for regulating the size of the discharge opening at the bottom of the container, thereby controlling the discharge of the feed, in accordance with the character of the same.

A further object of the invention is to provide a device of the above mentioned character, which is simple in construction, strong and durable.

Other objects and advantages of the invention will be apparent during the course of the following description.

In the accompanying drawings forming a part of this specification, and in which like numerals are employed to designate like parts throughout the same, Figure 1 is a central vertical sectional view through a hog feeder embodying my invention, Fig. 2 is a horizontal section taken on line 2—2 of Fig. 1, Fig. 3 is a similar view taken on line 3—3 of Fig. 1, Fig. 4 is a vertical section taken on line 4—4 of Fig. 1, Fig. 5 is a perspective view of the complete device, and, Fig. 6 is a fragmentary perspective view of one of the combined propelling and agitating rods.

In the drawings, the numeral 10 designates a base, forming the bottom of a trough, having sides 11. This trough is supported by runners 12, or the like.

The numeral 13 designates a substantially vertical support or pivot post, which may be solid or tubular. This post is arranged upon the base 10 and is provided at its lower end with a head 14, disposed within a recess 15. The head is held in place by an anchor plate 16, apertured at 17, to receive the post 13. The anchor plate 16 is secured to the base 10 by screws 18 or the like.

The numeral 19 designates inverted U-shaped braces, provided at their ends with feet 20, secured to the base 10 by screws 21 or the like. The upper portions of these braces cross, and are apertured at 22, receiving the post 13. These inverted U-shaped braces are preferably at a right angle to each other, and within the same is a conical guard 23, which prevents the feed from accumulating beneath these braces.

Surrounding the post 13 is a preferably cylindrical container or body portion 24, having reinforcing bands 25, 26, and 27, arranged inwardly of the same and secured thereto. The band 27 is arranged adjacent the top of the container, and secured to this band are support elements or straps 28, which cross each other at a right angle, and have apertures 29, which loosely receive the post 13.

Adjustable collars 31 and 32 are carried by post 13, above and below the support arm 28, and are adapted to be locked to the post by clamping bolts 33. By this means the container 24 may be vertically adjusted so that its lower end will be disposed at different distances from the base 10, thereby regulating the size of the passage 34.

Secured to the band 26 are guide arms or straps 34, which cross each other at a right angle, and are apertured at 35, to loosely receive the post 13.

The top of the container 24 is covered by a preferably conical cover or cap 36, increasing in diameter downwardly and having its lower end projecting outwardly beyond the container, as shown. A hinge 37 serves to pivotally connect the cover 36 and the top of the container, while a hasp 38 is carried by the cover to receive therein a staple 39, secured to the container 24. Any suitable means may be employed to retain the hasp upon the staple. A flexible element, such as a chain 40 may be arranged within the cover and secured to the apex thereof, this chain being also attached to the container at its top, or to the band 27, and serves to limit the opening movement of the cover.

The numeral 41 designates combined propelling and agitating rods, arranged within the container and extending longitudinally thereof, as shown. At their upper ends, these rods are bent outwardly and laterally forming pivot cranks 42, pivoted within openings 43, formed in the band 27, and retained therein by heads 44. At their lower ends, these rods are bent outwardly to form operating cranks or extensions 45, projecting through elongated slots 46, formed in the band 25 and container 24. These cranks or extensions are normally substantially radial, as shown in Fig. 3. The inward displacement of the rods 41 is prevented by guide straps 47, secured to the inner sides of the container, as shown. The rods 41 carry inwardly projecting agitating elements or fingers 48, serving to agitate the feed and cause it to move downwardly in the container.

The operation of the apparatus is as follows:

The cover 36 may be raised and the feed may be introduced into the container 24. This feed gravitates toward the discharge passage 34, and is fed therethrough upon the turning of the container. The hog pushes against the extension 45, which first causes the rod 41 to swing upon its pivot with relation to the container, agitating material, and subsequently effecting the turning movement of the container. A large hog may readily revolve the container, but a small or weak hog may not be able to do so, but will be sufficiently strong to swing the rod upon its pivot, thus agitating the feed, and aiding in its discharge through the passage 34.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. A hog feeding apparatus of the character described comprising a base for receiving the feed thereon, a post extending above the base and connected therewith, a rotatable container carried by the post, said container having its lower end spaced from the base, and combined means for rotating said container and agitating the feed pivotally mounted within the container, movable relatively thereto and having a portion arranged to be operated from the outside of the container.

2. An animal feeding apparatus comprising a base constructed to receive the feed thereon, a rotatable container carried by the base and having its lower edge spaced from the base to permit feed to pass from the container to the portion of the base situated beyond the lower edge of the container, and means located within the container and movable relatively thereto for agitating the feed within said container, said means including a part extending to the exterior of the container and designed to be operated by the animal for rotating the container and agitating the contents of the container.

3. A feeding apparatus of the kind defined by claim 2 in which the agitating means consists of a member pivotally mounted on the wall of the container and having an extension which projects beyond the container.

4. A hog feeding apparatus of the character described comprising, a receptacle for receiving feed, a rotatable container supported above the receptacle, and pivotally mounted rods extending longitudinally within the container movable relatively to said container and having corresponding ends bent laterally and projecting outwardly beyond the container.

5. A hog feeding apparatus of the character described comprising, a receptacle for receiving feed, a container above the receptacle provided with elongated slots, means to pivotally support the container, rods pivoted within the container and having extensions projecting outwardly beyond the slots, and agitating elements carried by the rods.

6. An animal operated apparatus for feeding stock comprising a base, a rotatable container carried by the base and having an open bottom, and a member pivotally mounted on the wall of the container, extending longitudinally of the container and having an extension which projects outwardly beyond the container for operation by the animal.

7. A hog feeding apparatus of the character described comprising a base to receive the feed thereon, a substantially vertical post arranged above the base, means to anchor the lower end of the post to the base, approximately U-shaped braces secured to the base and engaging the post, a container surrounding the post, an apertured supporting device secured to the upper portion of the container and receiving the post in the aperture thereof, a collar adjustably mounted upon the post beneath the apertured support, agitating means pivotally mounted on the container and arranged to be operated from the outside of the container to rotate the container, and a cover projecting outwardly beyond the container and hinged thereto.

8. A hog feeding apparatus of the character described comprising a base to receive the feed thereon, a substantially vertical post arranged above the base, means to anchor the lower end of the post to the base, approximately U-shaped braces secured to the base and engaging the post, a container surrounding the post, an apertured supporting device secured to the upper portion of the container and receiving the post in the aperture thereof, a collar adjustably mounted upon the post beneath the apertured support, agitating means pivotally mounted on the container and arranged to be operated from the outside of the container to rotate the container, a cover projecting outwardly beyond the container and hinged thereto, and means connected to the cover and container for limiting the movement of the cover.

In testimony whereof I hereunto affix my signature in the presence of two witnesses.

FRANK FOUTS. [L. S.]

Witnesses:
JOSEPH M. MCKINSEY,
O. M. ZINN.